(12) United States Patent
Amburey (10) Patent No.: US 11,463,310 B2
(45) Date of Patent: Oct. 4, 2022

(54) BLOCKCHAIN NETWORK MANAGEMENT

(71) Applicant: SAP SE, Walldorf (DE)

(72) Inventor: Krishnaji Rao Amburey, Chennai (IN)

(73) Assignee: SAP SE, Walldorf (DE)

( * ) Notice: Subject to any disclaimer, the term of this patent is extended or adjusted under 35 U.S.C. 154(b) by 13 days.

(21) Appl. No.: 16/195,930

(22) Filed: Nov. 20, 2018

(65) Prior Publication Data

US 2020/0162324 A1    May 21, 2020

(51) Int. Cl.
| | |
|---|---|
| *H04L 41/0816* | (2022.01) |
| *H04L 41/046* | (2022.01) |
| *H04L 41/06* | (2022.01) |
| *H04L 43/08* | (2022.01) |
| *H04L 41/0266* | (2022.01) |
| *H04L 67/1074* | (2022.01) |
| *H04L 67/1087* | (2022.01) |
| *H04L 9/06* | (2006.01) |

(52) U.S. Cl.
CPC ........ *H04L 41/0816* (2013.01); *H04L 9/0637* (2013.01); *H04L 41/0266* (2013.01); *H04L 41/046* (2013.01); *H04L 41/06* (2013.01); *H04L 43/08* (2013.01); *H04L 67/1076* (2013.01); *H04L 67/1093* (2013.01); *H04L 2209/38* (2013.01)

(58) Field of Classification Search
CPC .............. H04L 41/0816; H04L 9/0637; H04L 41/0266; H04L 41/046; H04L 41/06; H04L 43/08; H04L 67/1076; H04L 67/1093; H04L 2209/38; G06F 11/0793; G06F 11/203; G06F 9/4856; G06F 16/1834
See application file for complete search history.

(56) References Cited

U.S. PATENT DOCUMENTS

| | | | |
|---|---|---|---|
| 9,639,439 B2 | 5/2017 | Laicher et al. | |
| 2014/0379413 A1 | 12/2014 | Volkmer et al. | |
| 2017/0228371 A1* | 8/2017 | Seger, II | G06F 16/215 |
| 2017/0337534 A1 | 11/2017 | Goeringer et al. | |
| 2018/0101842 A1* | 4/2018 | Ventura | G06F 3/0619 |
| 2018/0109541 A1* | 4/2018 | Gleichauf | H04W 12/06 |
| 2018/0219686 A1* | 8/2018 | Cronie | H04L 9/3247 |
| 2018/0293556 A1* | 10/2018 | Hyun | G06Q 20/0658 |
| 2019/0116142 A1* | 4/2019 | Chalakudi | H04L 67/1097 |
| 2019/0258971 A1* | 8/2019 | Winarski | H04L 67/104 |
| 2020/0125738 A1* | 4/2020 | Mahatwo | G06F 21/64 |

FOREIGN PATENT DOCUMENTS

| | | |
|---|---|---|
| CN | 106453377 A | 2/2017 |
| CN | 106506203 A | 3/2017 |
| CN | 106982203 A | 7/2017 |

* cited by examiner

*Primary Examiner* — Lesa M Kennedy
(74) *Attorney, Agent, or Firm* — Sterne, Kessler, Goldstein & Fox P.L.L.C.

(57) ABSTRACT

Disclosed herein are system, method, and computer program product embodiments for management and monitoring of a blockchain network. An embodiment operates by configuring a node within a blockchain network to determine metadata about the blockchain network, wherein the blockchain network maintains a blockchain. The metadata is generated at the node, and provided to a solution manager. Using such a solution manager, it is possible to monitor, alert, and even react to changing conditions within the blockchain network.

17 Claims, 7 Drawing Sheets

BLOCKCHAIN NETWORK MANAGEMENT

BACKGROUND

As the number of applications using blockchain networks continue to grow, businesses will need to be able to deploy such applications in a reliable environment. Applications that demand responsiveness and uptime must therefore be built upon a reliable blockchain network that can adapt to the application. As a result, businesses deploying application using blockchain technology require tools to assist in improving the performance of the underlying blockchain network.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for management and monitoring of a blockchain network.

A blockchain is the name commonly given to a data structure comprising a list of records, called blocks, that are linked together in a way that is inherently resistant to modification of data within the blocks, as will be appreciated by a person of ordinary skill in the relevant art. In a typical non-limiting example, blocks in a blockchain are linked together by providing a cryptographic hash of a previous block within a new block in the chain. The blockchain is typically managed by a peer-to-peer network of nodes that mine new blocks of the blockchain by performing work, and adhere to a protocol for validating the new blocks being added to the blockchain. While this is a typical approach to deploying a blockchain, variations to network structure and the contents of the blockchain and the blocks within the blockchain are possible, and may be deployed for the specific needs of certain blockchain applications.

Figure 1:
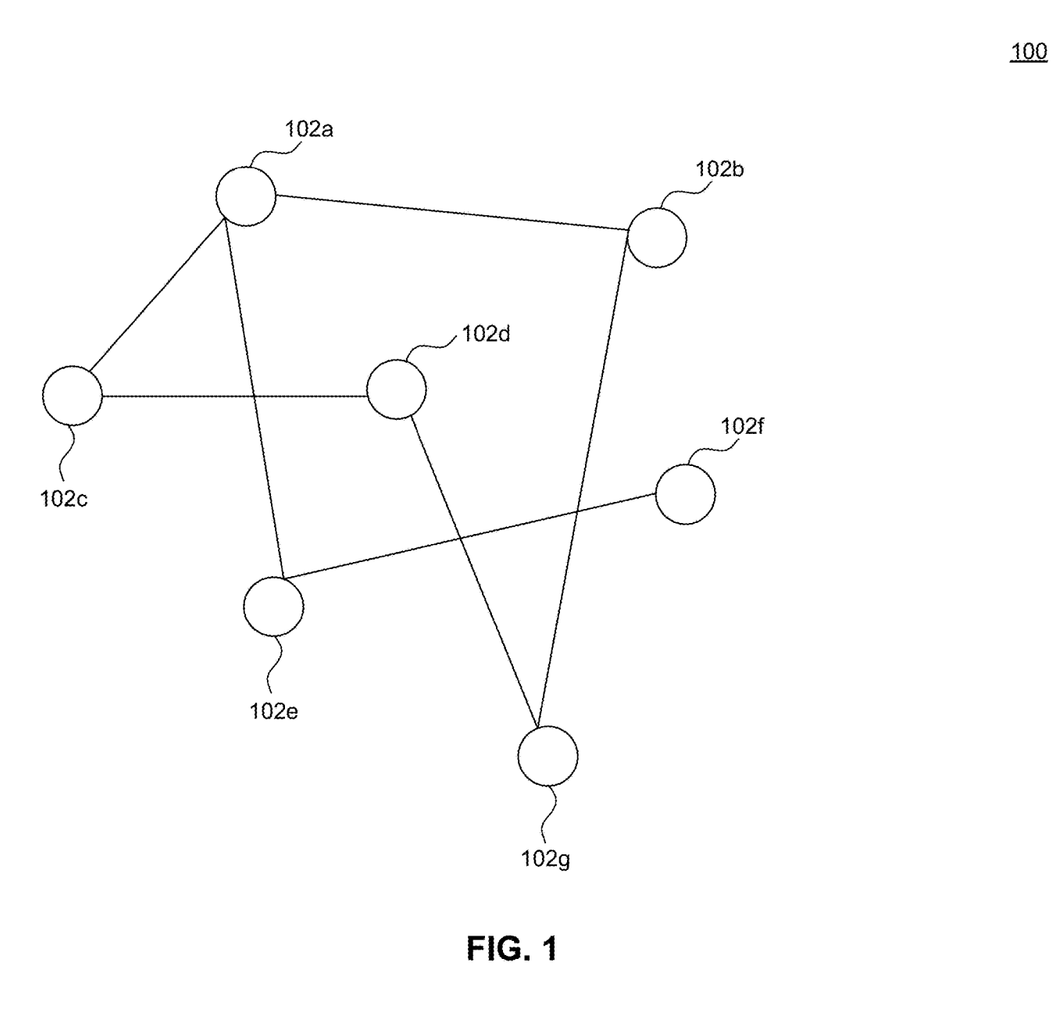
FIG. 1 is a diagram of a blockchain network, according to some embodiments.

FIG. 1 is a diagram of a blockchain network 100, according to some embodiments. Blockchain network 100 depicts a number of nodes 102a-102g (collectively, nodes 102) in a peer-to-peer arrangement, wherein each node 102 works to mine blocks to be added to the blockchain. The kinds of work that a node can perform in order to "solve" a block are many and divers, as a person of ordinary skill in the art will recognize (e.g., cryptocurrency payment, asset management, smart contracts, security, and other types of applications). These nodes 102 listen for and broadcast new transactions that need to be mined to the rest of the blockchain network 100. The nodes 102 also attempt to provide a solution for a given transaction in order to create a corresponding block in the blockchain. And, when a solution is provided by way of a new block, the nodes 102 update their view of the blockchain to include the new block. Nodes 102 may also validate the work of other nodes by confirming that a solved block is indeed correct, performing the work themselves and reaching the same conclusion as the other nodes.

Given the importance of the work the blockchain network 100 may be tasked with, certain assurances as to the reliability and quality of the network should be made. It is desirable to provide mechanisms for monitoring the performance of blockchain network 100, as well as to adjust operating parameters of the blockchain network responsive to the monitored performance feedback.

Figure 2:
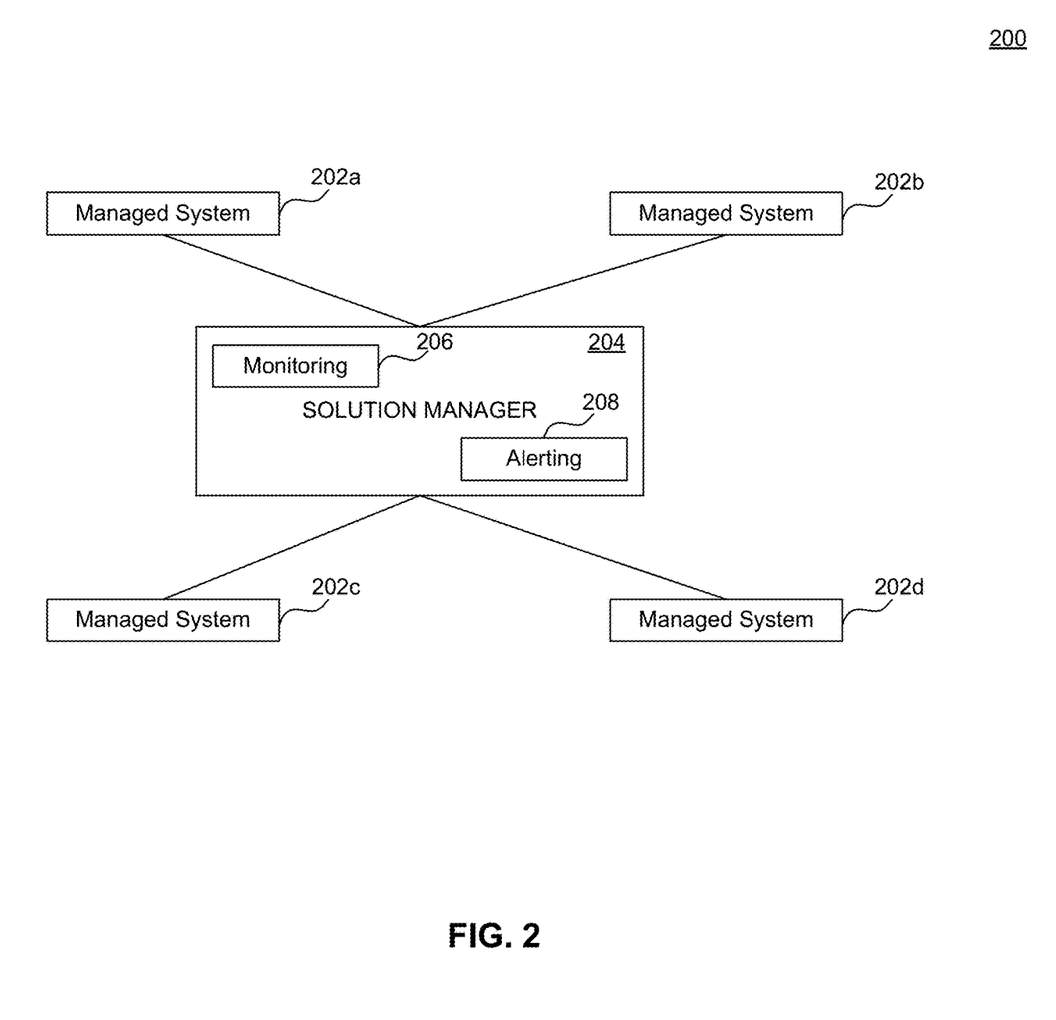
FIG. 2 is a diagram of a network managed by a solution manager, according to some embodiments.

FIG. 2 is a diagram of a network 200 managed by a solution manager 204, according to some embodiments. Managed systems 202a-202d (collectively, managed systems 202) provide information regarding their health and the health of the overall network 200 to the solution manager 204. Solution manager 204 may provide a number of different network management functions, including monitoring functionality provided by a monitoring module 206 and alert functionality provided by an alerting module 208. One skilled in the relevant art will recognize that the solution manager 204 may provide any number of application lifecycle management functions, including application operations (e.g., system monitoring, integration monitoring, user monitoring), business process operations (e.g., business process and interface monitoring, business process improvement, data consistency management, job scheduling management), IT service management, and test management, among other such functions.

Monitoring module 206 may track the health of managed systems 202 by receiving and logging health information sent to it by the managed systems 202 themselves. Or monitoring module 206 may monitor connectivity, assigned or running tasks, resource utilization, and other metrics of managed systems 202 and the overall network 200. Alerting module 208 may identify alert conditions within these metrics (e.g., identifying a metric that is outside of an expected range), and provide some sort of response. This response may be, for example, to notify a system administrator or notify some other user (such as a user of a managed system 202a that provided a metric that caused the alert condition).

Additionally or alternatively, responsive to a condition such as an alert condition, solution manager 204 may adjust some operating parameter of network 200 to resolve the alert condition. For example, solution manager 204 may instruct an additional managed system (such as a hypothetical managed system 202e, not shown) to join network 200 and accept work. Or, in another example, solution manager 204 may instruct a given managed system 202a to perform a certain task, such as rebooting, reestablishing a connection, or migrating a task to another given managed system 202b. One skilled in the relevant arts will appreciate that other tools that allow system administrators and other users to manage, assess, and maintain the overall health of network 200 and managed systems 202 are contemplated within the scope of solution manager 204.

Figure 3:
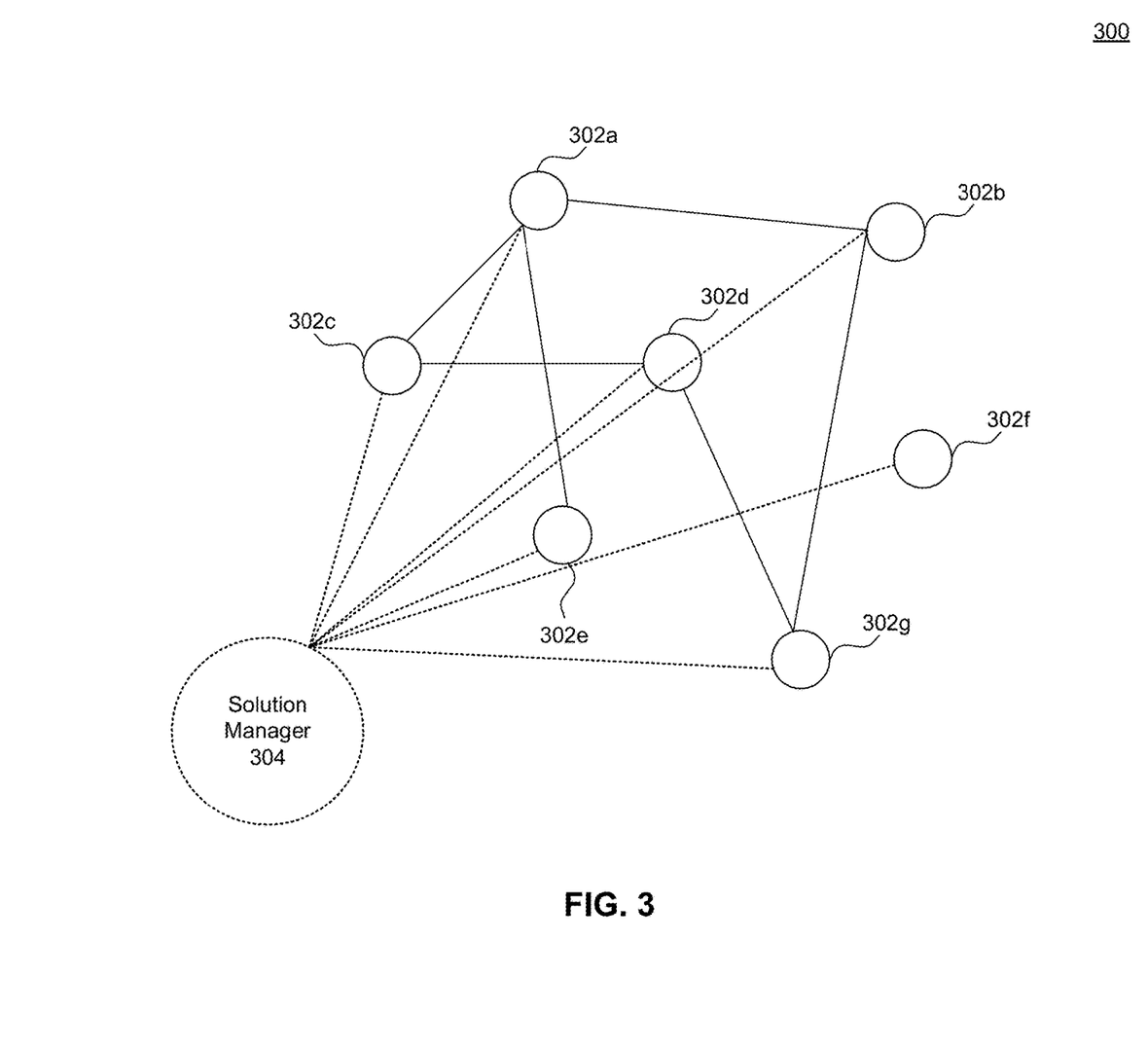
FIG. 3 is a diagram of a blockchain network centrally managed by a solution manager, according to some embodiments.

FIG. 3 is a diagram of a blockchain network 300 centrally managed by a solution manager 304, according to some embodiments. As discussed above with respect to FIG. 2, a solution manager 204 may provide, by way of a non-limiting example, tools for monitoring and alerting on conditions of network 200 and managed systems 202. Similarly, in FIG. 3, the solution manager 304 may be deployed in blockchain network 300 to monitor and alert on conditions of blockchain network 300 and nodes 302a-302g (collectively, nodes 302) of blockchain network 300. In this approach, nodes 302 are the managed systems.

In some embodiments, nodes 302 behave much like nodes 102 of blockchain network 100 in FIG. 1. Nodes 302 are disposed in a peer-to-peer arrangement, and they each work to mine blocks to be added to a blockchain. However, in addition, nodes 302 collect information about themselves and blockchain network 300 overall (i.e., metadata about the health of blockchain network 300), and provide this information to solution manager 304. Using this information, solution manager 304 may monitor blockchain network 300 as previously described, and may provide alerts as also previously described, based on the metadata.

In this approach, each node 302a-302g establishes a connection to solution manager 304 as shown in FIG. 3. Using these connections, nodes 302 can send the metadata directly to solution manager 304, where solution manager 304 will use the metadata for, for example, monitoring and alerting purposes.

The kinds of metadata that nodes 302 can gather may include the same kinds of metrics that are available in other networks, such as in network 200 of FIG. 2. In the context of blockchain network 300, however, some blockchain-specific metrics may be obtained by nodes 302 and provided to solution manager 304. These metrics include, by way of non-limiting examples:
  the time taken to broadcast messages across nodes 302,
  the time taken to create a new block of the blockchain,
  any incentives for generating the new block (e.g., financial compensation), and/or
  the number of outstanding transactions yet to be converted to blocks.

A provider of a blockchain solution using blockchain network 300 may rely on solution manager 304 to monitor, alert, and even respond to variations in these metrics in order to improve delivery of their solution. For example, a provider with greater incentives for generating new blocks, lower times to broadcast messages or create new blocks, and fewer outstanding transactions may operate their applications on the blockchain solution more efficiently, reliably, and/or quickly than a competitor that is not able to react based on these metrics.

The provider may even be able to react by adding a node, such as a hypothetical node 302h (not shown) to blockchain network 300 in order to address performance as indicated by these metrics. Or the provider may enhance an incentive in order to encourage additional nodes 302 to join the blockchain network 300 and mine transactions. This incentive need not be treated as compensation, but may instead or also serve as a prioritization mechanism. For example, higher point values may be given to encourage nodes 302 to move from other tasks to mining certain blocks, as directed by preferences set by a system administrator. One skilled in the relevant arts will appreciate that any number of possible responses may be taken by a provider based on the metrics.

Because in some embodiments nodes 302 establish connections with solution manager 304, other approaches that are less resource intensive may be desirable for given applications or circumstances. And, again depending on the circumstances of a given application, an approach that offloads the determination of the metadata from the nodes 302 to another entity may also be desired.

Figure 4:
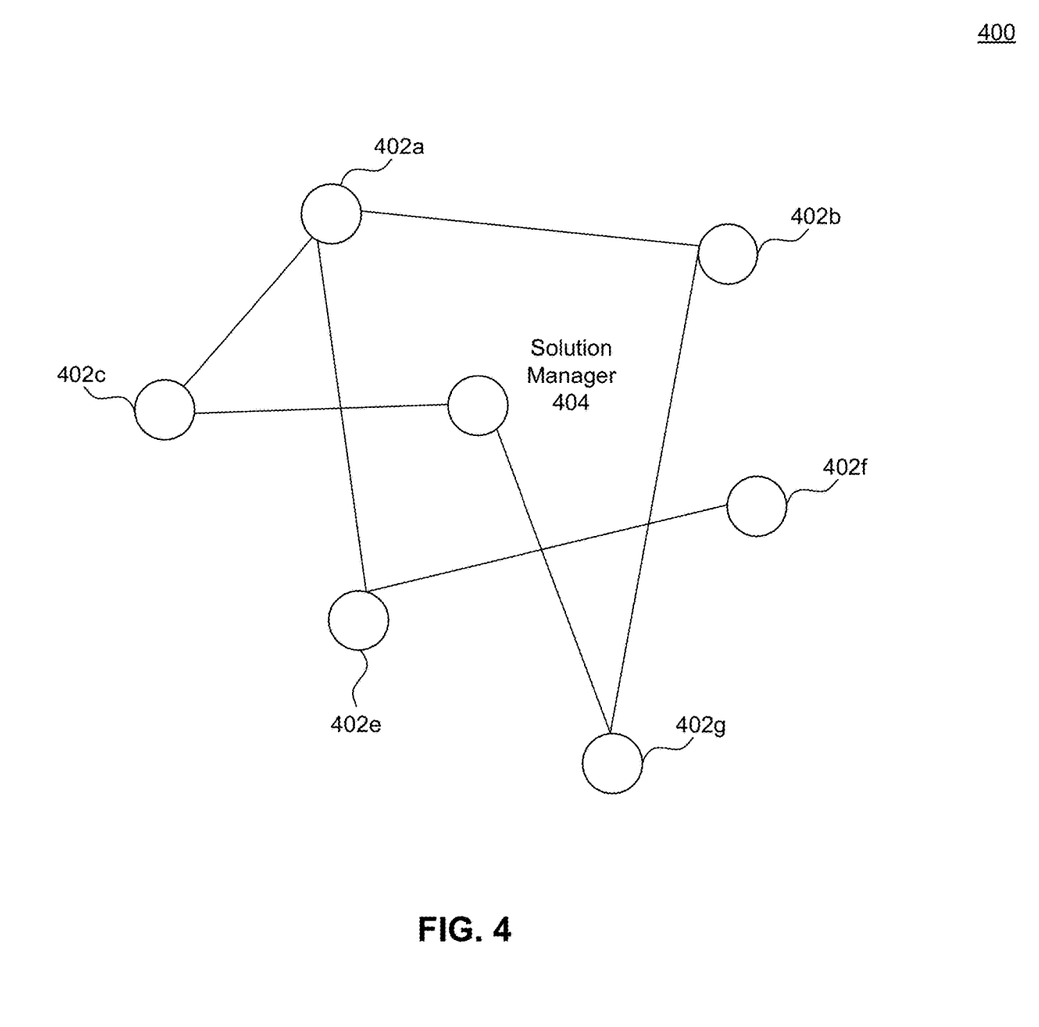
FIG. 4 is a diagram of a blockchain network managed by a solution manager as a node within the blockchain network, according to some embodiments.

FIG. 4 is a diagram of a blockchain network 400 managed by a solution manager 404 as a node within the blockchain network, according to some embodiments. In this approach, nodes 402a-402f (collectively, nodes 402) operate as before (e.g., as nodes 302 of FIG. 3). However, rather than each being in direct communication with a central solution manager, the solution manager node 404 is deployed as part of the blockchain network 400 itself.

In this approach, solution manager node 404 is treated by the blockchain network 400 as any other node 402. Solution manager node 404 registers to be part of the blockchain network 400, and receives the same kinds of information that any other node 402 would receive, including access to solved blocks, new transactions, and the blockchain itself. And, rather than receiving the metadata from nodes 402, solution manager node 404 is able to compute the metadata itself as part of the blockchain network 400. This approach does not require modification to nodes 402, or even any awareness by nodes 402 that solution manager node 404 is behaving as anything other than a node 402.

Additionally, should a particular application call for it, the solution manager node 404 can be configured in some embodiments to take on the responsibilities of a regular node 402, including broadcasting and mining. But solution manager node 404, as noted above, is not required to do so, and may be passive insofar as broadcast and mining operations are concerned.

In some embodiments, multiple solution manager nodes 404 may be deployed within blockchain network 400. This may be helpful in, for example, larger networks with many nodes that also require realtime or near-realtime access to health information about the blockchain network 400. Solution manager node 404 may either perform its own monitoring and alerting functions (among other solution manager functionality, as previously described), or may relay the metadata it has generated to a central solution manager (as described above) for monitoring and alerting purposes. In this hybrid approach, the central solution manager is only connected to one or more solution manager node(s) 404, reducing the number of connections needed.

Figure 5:
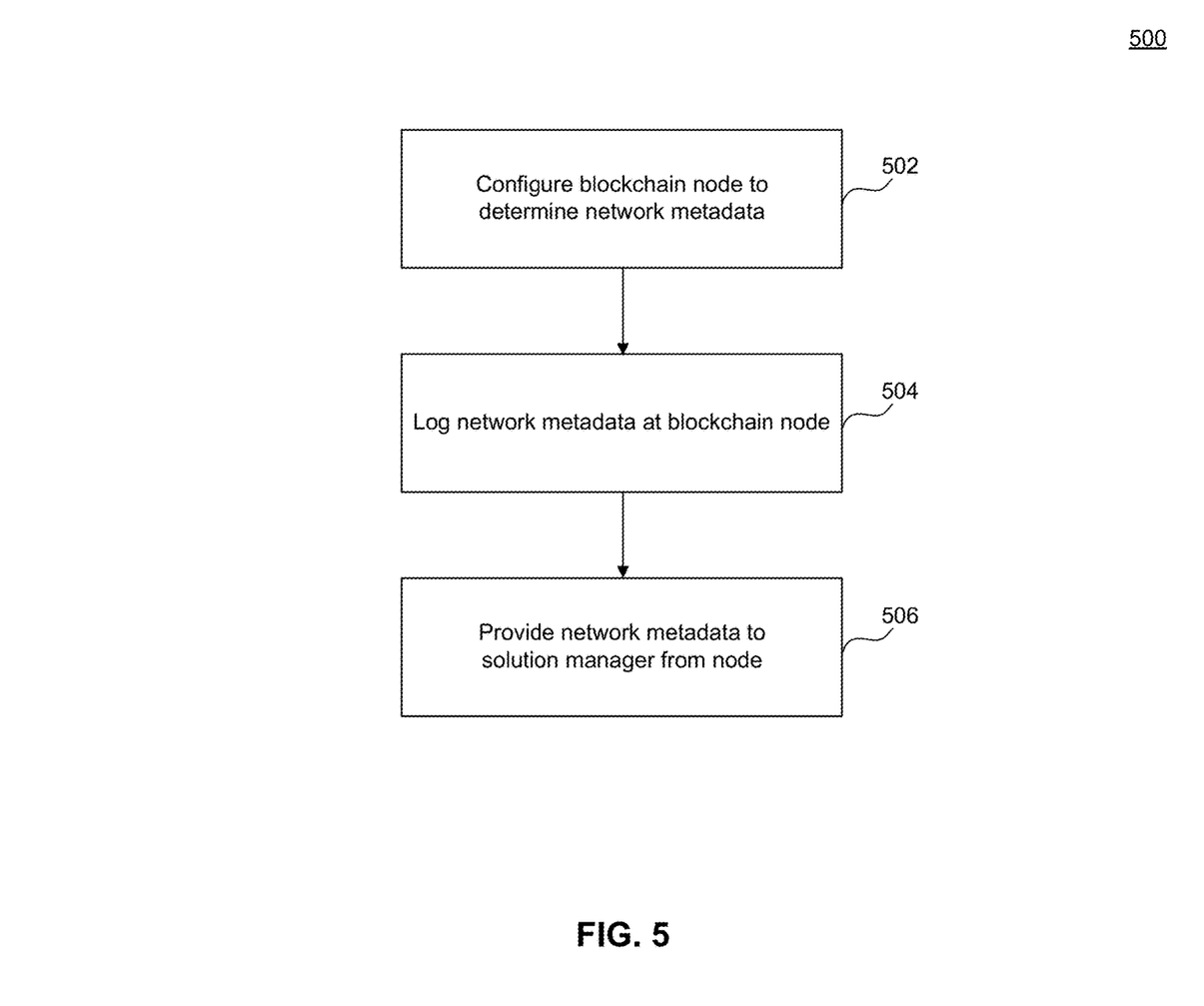
FIG. 5 is a flowchart illustrating steps by which a blockchain node provides metadata about the blockchain network to a solution manager, according to some embodiments.

FIG. 5 is a flowchart for a method 500 by which a blockchain node provides metadata about the blockchain network to a solution manager, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Method 500 is described with reference to FIGS. 3 and 4. However, method 500 is not limited to those example embodiments.

In 502, a blockchain node is configured to determine network metadata. For example, in FIG. 3, a node 302 of the blockchain network 300 is configured to determine metadata. And in FIG. 4, again for example, solution manager node 404 is configured to determine the metadata (while nodes 402 operate per usual).

In 504, the metadata is logged at the blockchain node. Again, in the example of FIG. 3, a node 302 of the blockchain network 300 generates and logs the metadata. In the example of FIG. 4, solution manager node 404 is responsible for generating and logging the metadata.

In 506, the metadata is provided to the solution manager by the node. In the example of FIG. 3, a node 302 may communicate with a central solution manager, such as solution manager 304, to provide this metadata. In the example of FIG. 4, this step may be optional—solution manager node 404 may itself handle any monitoring, alerting, or other solution manager functionality, or it may interface with a central solution manager (akin to solution manager 304 of FIG. 3) to relay the metadata it has generated.

Figure 6:
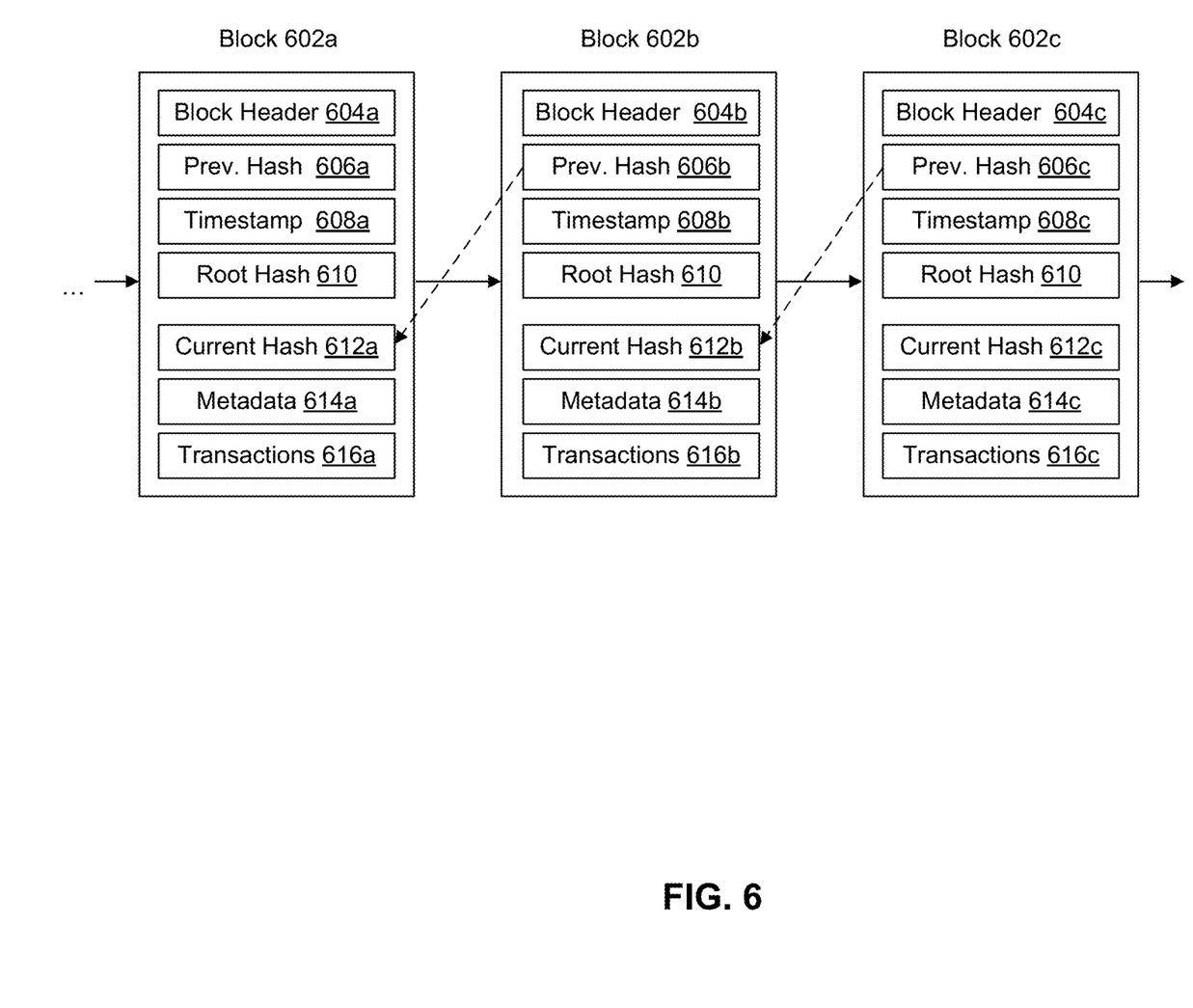
FIG. 6 is an example blockchain that stores metadata about the blockchain network, according to some embodiments.

There are other approaches by which the metadata generated by a node within a blockchain network may be conveyed to a monitoring and/or alerting system, such as a solution manager. One such approach is shown in FIG. 6, which is an example blockchain 600 that stores metadata about the blockchain network, according to some embodiments. Rather than using connections from nodes 302 to solution manager 304 in FIG. 3 to communicate metadata, or the distributed solution manager node(s) 404 of FIG. 4 to generate the metadata, nodes can place the generated metadata right into the blockchain. From there, a solution manager with access to the blockchain may read the metadata and track the health of the blockchain network, as previously described.

The example blockchain 600 is shown as having exemplary blocks 602a-602c (collectively, blocks 602). Each block has corresponding parts (denoted by the legend "a," "b," or "c" following the element number) in the exemplary embodiment. Some of these parts are understood by one of ordinary skill in the relevant art as either required, expected, or commonly used parts of a block within a blockchain, such as a block header 604, a hash of the previous block 606, a timestamp 608, a root hash 610, a current hash 612, and transaction information 616.

However, in accordance with some embodiments, a block 602 may have metadata 614 included directly within it. In this approach, when a node within a blockchain network generates block 602, it also generates the metadata (as previously described) and inserts this metadata directly within the block when adding it to the blockchain. This metadata may, in some embodiments, be cryptographically protected from access, so that only a solution manager with appropriate permissions may read the metadata. The blockchain may only be available to certain entities or within certain protected networks, which may also be used to control access to the metadata to a solution manager with appropriate permissions.

Figure 7:
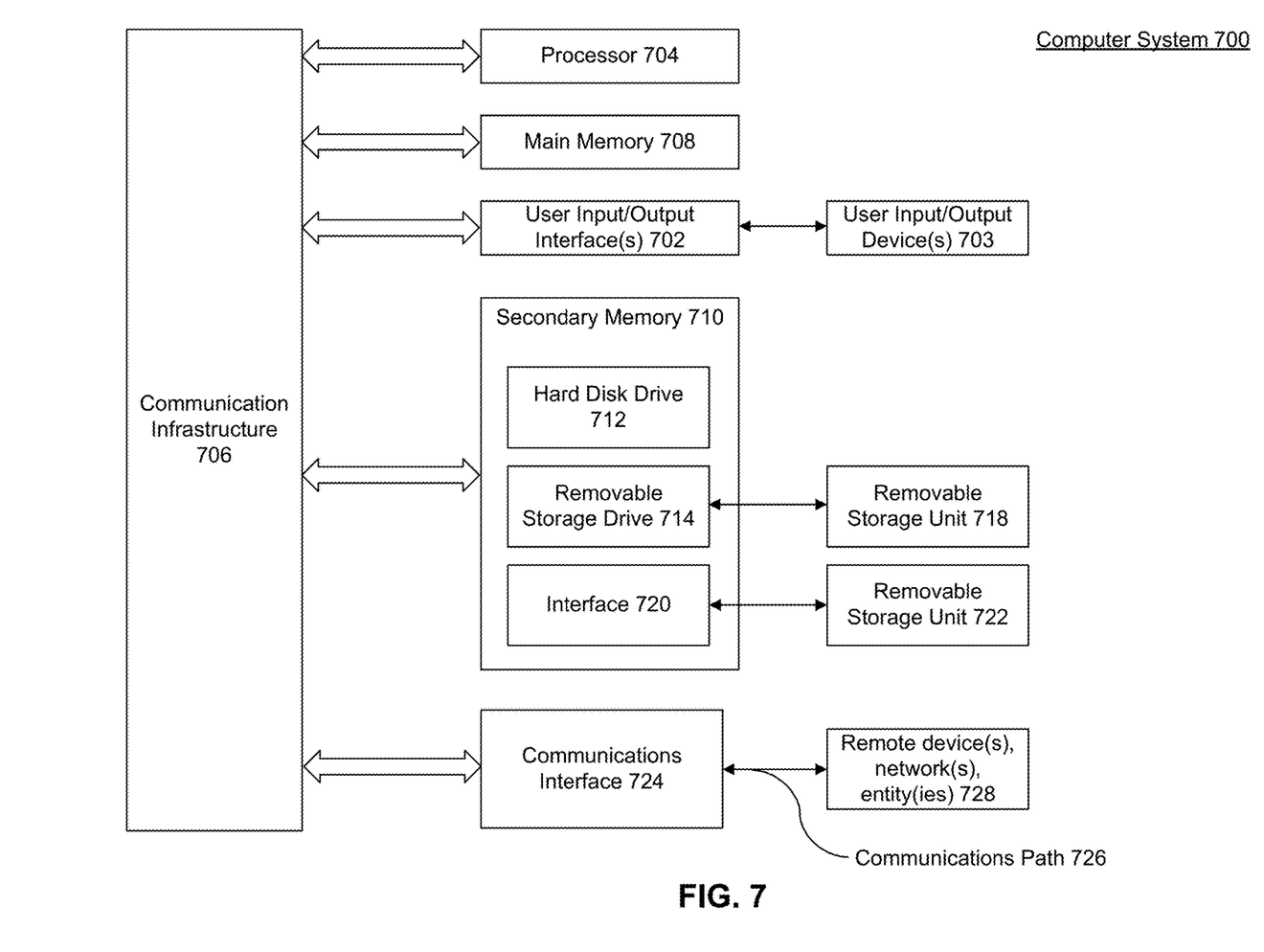
FIG. 7 is an example computer system useful for implementing various embodiments.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
monitoring, by a solution manager of a blockchain network comprising a plurality of nodes, metadata received from the plurality of nodes indicative of a health of the blockchain network;
identifying an alert condition associated with the health of the blockchain network based on the metadata;
providing an incentive, responsive to the alert condition, encouraging a new node to join the blockchain network, wherein the incentive comprises providing a higher point value to encourage the new node to move from another task to mining a block; and
instructing the new node, communicatively coupled to the solution manager, to perform an action directed to improving the health of the blockchain network responsive to the identified alert condition.

2. The computer implemented method of claim 1, further comprising:
receiving, by the solution manager, blockchain network transactions from a plurality of additional nodes within the blockchain network.

3. The computer implemented method of claim 2, wherein the solution manager is configured to mine the blockchain network to generate a new block of the blockchain.

4. The computer implemented method of claim 1, wherein the metadata comprises at least one of:
a time taken to broadcast messages across nodes of the blockchain network,
a time taken to create a new block of the blockchain,
an incentive for generating the new block of the blockchain, or
a number of outstanding transactions.

5. The computer implemented method of claim 1, wherein the solution manager is configured to adjust an operating parameter of the blockchain network responsive to the alert condition.

6. The computer implemented method of claim 1, wherein the action comprises migrating a task from a first node of the plurality of nodes to the new node.

7. The computer implemented method of claim 1, wherein the action comprises both joining the network and accepting work.

8. A system, comprising:
a memory; and
at least one processor coupled to the memory and configured to perform operations comprising:
monitoring, by a solution manager of a blockchain network comprising a plurality of nodes, metadata received from the plurality of nodes indicative of a health of the blockchain network;
identifying an alert condition associated with the health of the blockchain network based on the metadata;
providing an incentive, responsive to the alert condition, encouraging a new node to join the blockchain network, wherein the incentive comprises providing a higher point value to encourage the new node to move from another task to mining a block; and
instructing the new node, communicatively coupled to the solution manager, to perform an action directed to improving the health of the blockchain network responsive to the identified alert condition.

9. The system of claim 8, the operations further comprising:
receiving, by the solution manager, blockchain network transactions from a plurality of additional nodes within the blockchain network.

10. The system of claim 9, wherein the solution manager is configured to mine the blockchain network to generate a new block of the blockchain.

11. The system of claim 8, wherein the metadata comprises at least one of:
a time taken to broadcast messages across nodes of the blockchain network,
a time taken to create a new block of the blockchain,
an incentive for generating the new block of the blockchain, or
a number of outstanding transactions.

12. The system of claim 8, wherein the solution manager is configured to adjust an operating parameter of the blockchain network responsive to the alert condition.

13. A non-transitory computer-readable device having instructions stored thereon that, when executed by at least one computing device, cause the at least one computing device to perform operations comprising:
monitoring, by a solution manager of a blockchain network comprising a plurality of nodes, metadata received from the plurality of nodes indicative of a health of the blockchain network;
identifying an alert condition associated with the health of the blockchain network based on the metadata;
providing an incentive, responsive to the alert condition, encouraging a new node to join the blockchain network, wherein the incentive comprises providing a higher point value to encourage the new node to move from another task to mining a block; and
instructing the new node, communicatively coupled to the solution manager, to perform an action directed to improving the health of the blockchain network responsive to the identified alert condition.

14. The non-transitory computer-readable device of claim 13, the operations further comprising:
receiving, by the solution manager, blockchain network transactions from a plurality of additional nodes within the blockchain network.

15. The non-transitory computer-readable device of claim 14, wherein the solution manager is configured to mine the blockchain network to generate a new block of the blockchain.

16. The non-transitory computer-readable device of claim 13, wherein the metadata comprises at least one of:
a time taken to broadcast messages across nodes of the blockchain network,
a time taken to create a new block of the blockchain,
an incentive for generating the new block of the blockchain, or
a number of outstanding transactions.

17. The non-transitory computer-readable device of claim 13, wherein the solution manager is configured to adjust an operating parameter of the blockchain network responsive to the alert condition.

* * * * *